United States Patent
Amini et al.

(10) Patent No.: US 9,071,664 B2
(45) Date of Patent: *Jun. 30, 2015

(54) METHODS AND APPARATUS FOR SECURE AND ADAPTIVE DELIVERY OF MULTIMEDIA CONTENT

(75) Inventors: Lisa D. Amini, Yorktown Heights, NY (US); Pascal Frossad, Bulle (CH); Chitra Venkatramani, Roslyn Heights, NY (US); Olivier Verscheure, Harrison, NY (US); Peter Westerink, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 1071 days.

This patent is subject to a terminal disclaimer.

(21) Appl. No.: 12/533,643

(22) Filed: Jul. 31, 2009

(65) Prior Publication Data
US 2009/0290706 A1 Nov. 26, 2009

Related U.S. Application Data

(63) Continuation of application No. 11/781,699, filed on Jul. 23, 2007, now Pat. No. 7,623,657, which is a continuation of application No. 10/410,455, filed on Apr. 9, 2003, now Pat. No. 7,313,236.

(51) Int. Cl.
*H04L 9/00* (2006.01)
*H04L 29/06* (2006.01)

(52) U.S. Cl.
CPC ........ *H04L 65/602* (2013.01); *H04L 29/06027* (2013.01); *H04L 65/607* (2013.01)

(58) Field of Classification Search
CPC ............ H04L 29/06027; H04L 65/607; H04L 65/602
USPC .................... 380/42, 217, 260, 280
See application file for complete search history.

(56) References Cited

U.S. PATENT DOCUMENTS 5,592,470 A * 1/1997 Rudrapatna et al. .......... 370/320
6,151,632 A 11/2000 Chaddha et al.
(Continued)

FOREIGN PATENT DOCUMENTS

EP 1195745 10/2002

OTHER PUBLICATIONS

J.G. Apostolopous et al., "Unbalanced Multiple Description Video Communication Using Path Diversity," IEEE International Conference on Image Processing (ICIP), Thessaloniki, Greece, 4 pages, Oct. 2001.
(Continued)

Primary Examiner — Kambiz Zand
Assistant Examiner — Tongoc Tran
(74) Attorney, Agent, or Firm — Anne V. Dougherty; Ryan, Mason & Lewis, LLP

(57) ABSTRACT

Techniques for securely and adaptively delivering multimedia content are disclosed in which a set of alternate access units for each time slot is obtained. Then, the encryption stream index of each access unit from the set of alternate access units of the previous time slot are obtained. An encryption stream index is then assigned to each access unit in the set of alternate access units in the current time slot, such that the encryption index increases over time. Thus, the invention overcomes the problem of encrypting a multimedia stream that may have multiple access units for each time slot by selecting the encryption index for each access unit such that the encryption index increases, regardless of which access unit the delivery system (e.g., server) selects for transmission.

26 Claims, 7 Drawing Sheets

(56) References Cited

U.S. PATENT DOCUMENTS

| | | |
|---|---|---|
| 6,160,988 A | 12/2000 | Shroyer |
| 6,516,297 B1 | 2/2003 | Servetto et al. |
| 6,741,252 B2 | 5/2004 | Hijiri et al. |
| 6,819,670 B1 * | 11/2004 | Fenner .................. 370/392 |
| 6,985,589 B2 | 1/2006 | Morley et al. |
| 6,996,248 B2 | 2/2006 | Fudge et al. |
| 2002/0018490 A1 | 2/2002 | Abrahamsson et al. |
| 2004/0199653 A1 | 10/2004 | Amini et al. |
| 2004/0215802 A1 | 10/2004 | Amini et al. |

OTHER PUBLICATIONS

Z-L. Zhang et al., "Efficient Selective Frame Discard Algorithms for Stored Video Delivery Across Resource Constrained Networks," pp. 1-26, 1999.

* cited by examiner

N(i) = 3           N(i+1) = 2         N(i+2) = 3         N(i+3) = 2
max = L(1,i)       max=L(2,i+1)       max=L(3,i+2)       max=L(1,i+3)

METHODS AND APPARATUS FOR SECURE AND ADAPTIVE DELIVERY OF MULTIMEDIA CONTENT

CROSS-REFERENCE TO RELATED APPLICATION(S)

This application is a continuation of U.S. application Ser. No. 11/781,699, filed on Jul. 23, 2007, which is a continuation of U.S. application Ser. No. 10/410,455, filed on Apr. 9, 2003, the disclosures of which are incorporated herein by reference.

FIELD OF THE INVENTION

The present invention relates to data delivery techniques and, more particularly, to techniques for delivering multimedia content in a secure and adaptive manner.

BACKGROUND OF THE INVENTION

Secure delivery of multimedia content, e.g., audio and video, over a network, such as an IP (Internet Protocol) network, has become an important goal for all involved with such content, e.g., content authors, content providers, and content receivers (e.g., clients). Existing approaches attempt to achieve secure delivery of multimedia content in a number of ways. Some examples are described below.

In an approach referred to as download-based security, encrypted content is downloaded to a client device in its entirety. In an alternative approach referred to as transmission-based security, content is encrypted at the time of transmission. Encrypting the content directly before transmission and decrypting directly upon receipt allows the content to be streamed, i.e., the client device can process portions of the content and is not required to receive the content in its entirety before playback.

In another approach referred to as end-to-end security, meta-information required to effectively stream content is extracted before encryption. In this approach, the content creator, or publisher, can encrypt the content before transmission to delivery systems. The content remains in this encrypted form until it reaches the client. The client retrieves rights information and decryption keys from a rights management system. Thus, while the content is not adaptable, the delivery system can stream the content to the client and end-to-end security can be maintained.

SUMMARY OF THE INVENTION

The present invention provides techniques for securely and adaptively delivering multimedia content in a manner which overcomes deficiencies associated with existing approaches.

In one illustrative aspect of the invention, techniques for processing content for delivery in a secure and adaptive manner may include the following steps/operations. It is assumed that a set of alternate access units for each time slot is obtained. An encryption stream index is then assigned to each access unit in the set of alternate access units in the current time slot, such that an encryption index increases over time. For example, the assigning step may include assigning an encryption index to each access unit in the set of alternate access units in the current time slot such that an encryption index increases with respect to each encryption index of each access unit from a set of alternate access units for a previous time slot. Thus, the invention overcomes the problem of encrypting a multimedia stream that may have multiple access units for each time slot by selecting the encryption index for each access unit such that the encryption index increases, regardless of which access unit the delivery system (e.g., server) selects for transmission.

Advantageously, the invention overcomes disadvantages associated with existing multimedia security approaches. By way of example only, the techniques of the invention serve to avoid: (i) the consumption of significant storage resources at a client device associated with large objects, such as video objects (e.g., one problem known to exist in the download-based approach); (ii) intermediate devices, such as proxies and delivery servers, having access to content in its unencrypted form (e.g., one problem known to exist in the transmission-based approach); and (iii) the inability to adapt content to the characteristics of a client device, or a connection over which the client connects to a delivery system or server (e.g., one problem known to exist in the end-to-end security approach).

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary multimedia content authoring and delivery environment. It should be understood, however, that the invention is not limited to use with any particular type of content authoring and delivery environment. The invention is instead more generally applicable for use with any content authoring and delivery environment in which it is desirable to provide secure and adaptive delivery of authored content.

Figure 1:
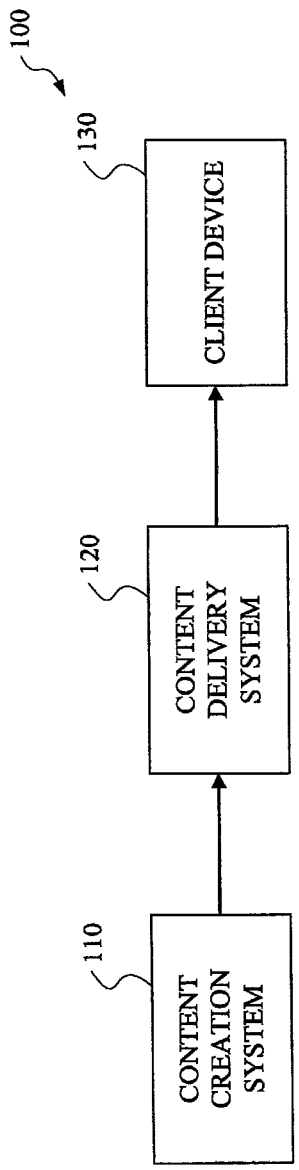
FIG. 1 is a block diagram illustrating an environment in which techniques of the present invention may be implemented.

Referring initially to FIG. 1, a block diagram illustrates an environment in which techniques of the present invention may be implemented. As shown, environment 100 includes a content creation system 110, a content delivery system 120, and client device 130. It is to be understood that one or more of the components shown in FIG. 1 may be coupled to one or more other components shown in FIG. 1 by a network such as an IP network (e.g., Internet). However, it is to be further understood that the techniques of the invention may be implemented in accordance with other public networks, private networks, and/or in systems that do not employ a network at all.

Thus, in general, multimedia content is created by authors or publishers in accordance with content creation system 110. The created content is then sent to content delivery system 120. Content delivery system 120 then delivers content to client device 130 upon receipt of a request therefrom. It is to be appreciated that, while only one client device is shown, there are typically multiple client devices that receive content from content delivery system 120. Similarly, there may be multiple delivery systems delivering the content, possibly using different delivery protocols and mechanisms.

Before explaining illustrative embodiments for implementing principles of the invention and thus further explaining detailed processes performed by components shown in FIG. 1, some definitions of terms to be used in accordance with such explanations are provided below.

Access Unit: The smallest chunk or portion of multimedia data that has a unique time. For example, a video picture in a video sequence or an audio frame in a sound track. An access unit may also be referred to as a description.

RTP: Real Time Protocol. A framing method for transporting multimedia data over IP networks in the form of packets.

RTP packet: A chunk or portion of multimedia data as sent over an IP network, prepended with certain information, such as a time stamp and a sequence number.

Encryption key: The secret information that is used to encrypt and decrypt data. A key is typically several bytes, such as seven bytes for the Data Encryption Standard (DES) and 16 bytes (or more) for the Advanced Encryption Standard (AES).

Encryption index: An integer value that can be used to start or restart the encryption or decryption process in the middle of a stream of data. Having this information with the corresponding encrypted data allows for features such as data loss handling, random access, and joining a broadcast.

Figure 2:
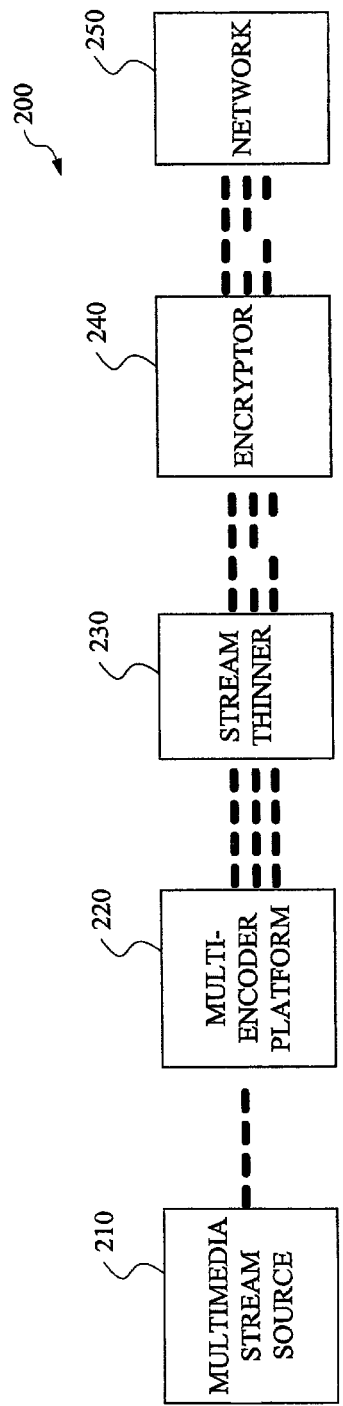
FIG. 2 is a block diagram illustrating a data processing system according to an embodiment of the present invention.

Referring now to FIG. 2, a block diagram illustrates a data processing system according to an embodiment of the present invention. More specifically, FIG. 2 illustrates functional components that may be used in accordance with a content creation system (e.g., content creation system 110 of FIG. 1) and a content delivery system (e.g., content delivery system 120 of FIG. 1). As will be explained, data processing system 200 of FIG. 2 generates a stream that offers a choice from multiple access units for a single time slot within which the access units are to be encrypted.

As shown, a multimedia stream source 210 offers unencoded access units (e.g., frames) to a multi-encoder platform 220. An example of an unencoded video frame (video access unit) is an image with red, green, and blue pixels. This platform 220 generates multiple encoded access units for each offered unencoded access unit and passes off the multiple encoded access units to a stream thinner 230. Encoded (e.g., compressed) access units may, for example, be obtained by applying a standard data compression technique such as MPEG-1, MPEG-2, or MPEG-4. Given use of one of the compression techniques, say MPEG-4, alternate or multiple encodings corresponding to an access unit may therefore include: (i) a version of the video frame or image (access unit) encoded via the MPEG-4 technique in accordance with a low bandwidth encoder; (ii) a version of the video frame or image (access unit) encoded via the MPEG-4 technique in accordance with an intermediate bandwidth encoder; and (iii) a version of the video frame or image (access unit) encoded via the MPEG-4 technique in accordance with a high bandwidth encoder. The idea being that alternate versions of the access unit are made available so that the appropriate access unit can be provided to a client device that best matches a parameter or characteristic associated with the client device or connection, e.g., the access unit encoded at a low bandwidth is provided to a client device with limited bandwidth capability, the access unit encoded at an intermediate bandwidth is provided to a client device with intermediate limited bandwidth capability, and so on. The level of bandwidth (e.g., low, intermediate, high) is relative to the multimedia application and client devices receiving the multimedia. It is to be understood that the above example of a form of multiple encodings is only one example of a form of multiple encodings and, thus, the invention is not limited to any particular form.

Stream thinner 230 can remove certain access units for each time slot based upon some criterion. One example of stream thinning or access unit removal is the case where a time slot contains several access units that are very similar in properties such as size. In that case, those similar access units could all be represented by a single selection from those similar access units. So, an access unit can be discarded from one stream for a certain time slot, and an access unit from another stream in the same time slot is used instead. The thinned access unit streams are input into encryptor 240, where they are encrypted. The output of encryptor 240 is finally sent to an output device 250, such as a network protocol formatter or a file writer.

In terms of FIG. 1, it is to be appreciated that the multi-encoder platform 220, the stream thinner 230, and the encryptor 240 may be implemented as part of content creation system 110, while the network protocol formatter 250 may be implemented as part of content delivery system 120. However, the functional components may be implemented in accordance with other arrangements.

The multi-encoder platform and stream thinner operations may be performed via a number of known multiple encoding generation and stream thinning techniques. By way of one example only, techniques described in J. G. Apostolopoulos et al., "Unbalanced Multiple Description Video Communication Using Path Diversity," IEEE International Conference on Image Processing (ICIP), Thessaloniki, Greece, October 2001, the disclosure of which is incorporated by reference herein, may be employed to generate multiple encodings of the multimedia content. An example of a stream thinning technique that may be employed is described in Z. L. Zhang et al., "Efficient Selective Frame Discard Algorithms for Stored Video Delivery Across Resource Constrained Networks," Proceedings of IEEE INFOCOM Conference, vol. 2, pp. 472-479, 1999, the disclosure of which is incorporated by reference herein.

In a preferred embodiment, techniques described in U.S. patent application Ser. No. 10/406,715 (entitled "Multiple Description Hinting and Switching for Adaptive Media Services"), filed Apr. 8, 2003 and commonly assigned, and in U.S. patent application Ser. No. 10/409,303 (entitled "System and Method for Resource-Efficient Live Media Streaming to Heterogeneous Clients"), filed Apr. 3, 2003 and commonly assigned, the disclosures of which are incorporated by reference herein, may be employed for the multiple encoding generation and stream thinning operations.

More specifically, in the above-referenced patent applications (namely, Ser. Nos. 10/409,303 and 10/406,715), techniques which allow adaptation, without requiring access to unencrypted content, are provided. The techniques enable adaptation by creating multiple encodings (also referred to as descriptions) of portions (access units) of the content, and packaging these descriptions with meta-data that enables adaptation at the delivery server. Adaptation occurs at the delivery server by selecting and transmitting the encoding which best meets the connection bandwidth and packet loss conditions, as well as the client device characteristics.

In general, the techniques of the above-referenced patent applications may be implemented in the multi-encoder platform 220 and stream thinner 230 as follows. A live media source feeds a multi-encoder station, which outputs several descriptions or bitstreams of the source signal. These bitstreams have different characteristics in terms of bit-rate or structure (e.g., encoding modes), in order to cover the requirements of the different clients. The bitstreams are basically a series of compressed data units (e.g., video frames). The different encoding parameters generate several compressed descriptions of the original data units. In general, the clients receive one description for each data unit, but these descriptions can come from different compressed bitstreams. The number of descriptions can also vary depending on the transmission conditions, and data units can even be skipped if the available bandwidth becomes too small. The encoded bitstreams are sent to a stream thinner, which dynamically decides which descriptions will be sent over the network to the clients. The stream thinner can decide to send all the bitstreams, one complete bitstream and parts of the others, or any combination it will determine as being appropriate to optimally serve all the receivers. The stream thinner implements a pruning algorithm based on the media content, and on the feedback (e.g., Real Time Control Protocol or RTCP) it receives from the network about the actual infrastructure configuration and client capabilities. Basically, if descriptions from different streams are similar enough, one or more of them will be discarded without penalizing the quality of service perceived by the receivers.

While preferred and other illustrative embodiments are described above, it is to be understood that the invention is not limited to any particular multiple encoding generation and/or stream thinning techniques.

In the following description of illustrative embodiments, a multimedia streaming network that may exhibit data loss is preferably assumed. An example of such a network protocol is RTP over User Datagram Protocol (UDP), where data packets may be dropped enroute from server to client.

When encrypting multimedia content in such an application environment, it is preferable to use an encryption method that allows decryption which is independent of previously decrypted data. Examples of such encryption methods include "SEAL" (as described in P. Rogaway et al., "A Software-Optimized Encryption Algorithm," Journal of Cryptology, vol. 11, no. 4, pp. 273-287, 1998, the disclosure of which is incorporated by reference) and "Block Cipher in Counter Mode" (as described in B. Schneier, "Applied Cryptography," John Wiley & Sons, 1996, the disclosure of which is incorporated by reference). Examples of block ciphers are DES (e.g., as described in the above-referenced B. Schneier et al. text) and AES (e.g., as described in NIST FIPS 197, the disclosure of which is incorporated by reference herein). Both for "Block Cipher in Counter Mode" and for "SEAL," the cipher text can be decrypted at any location in the cipher text stream, given that exact location in the stream, i.e., the byte offset or the "encryption index." Therefore, to be able to handle data loss, the invention preferably employs (e.g., in accordance with encryptor block 240) an encryption method such as described above, and makes the encryption index available for decryption. This means that for a protocol like RTP over UDP, typically the encryption index is sent with every RTP packet, thus allowing each packet to be independently decrypted.

Note that having an encryption index also enables random access, thus allowing searching of a multimedia presentation file and joining a broadcasted multimedia stream at a point somewhere other than at the beginning of the stream, e.g., midstream.

Combining access unit interchangeability (i.e., selection of an encoding of an access unit from among multiple encodings of the access unit) and end-to-end security imposes some constraints on how the encryption index is chosen. As a cryptographic constraint, one should adhere to the rule of not using the same index twice for the same encryption key. Violating this rule introduces a cryptographic weakness that will make the system insecure. That constraint can be overcome by encrypting alternate access units (descriptions) with different keys. However, it should be taken into account that one may not want to transmit a complete index (e.g., 132 bits) by relying on an index that always increases only minimally from packet to packet. Sending a complete index would increase the overhead from a mere 16-24 bits to 132 bits, which can be deemed unacceptable, especially if packets are small.

Therefore, in accordance with the present invention, the problem of encrypting a multimedia stream that may have multiple access units for each time slot is overcome by selecting the encryption index for each access unit such that the encryption index always increases, regardless of which access unit the delivery system (e.g., server) selects for transmission. It is to be appreciated that such selection or assignment of encryption indexes may be performed in encryptor 240 of FIG. 2.

Accordingly, in general, a methodology of delivering content in a secure and adaptive manner may include using a set of alternate access units (e.g., multiple encodings of an access unit) for each time slot. Then, the encryption stream index of each access unit from the set of alternate access units of the previous time slot are obtained (e.g., retrieved from storage). An encryption stream index is then assigned to each access unit in the set of alternate access units in the current time slot, such that the encryption index increases over time, e.g., as compared to indexes assigned to access units of the previous time slot.

The following description will provide explanation of an overview of an encryption index assignment methodology of the present invention which may accomplish the above solution, followed by explanation of embodiments for use in three different cases (i.e., method 1, method 2, and method 3). As will be seen, each case may assign the encryption index to each access unit in each time slot differently.

Figure 3:
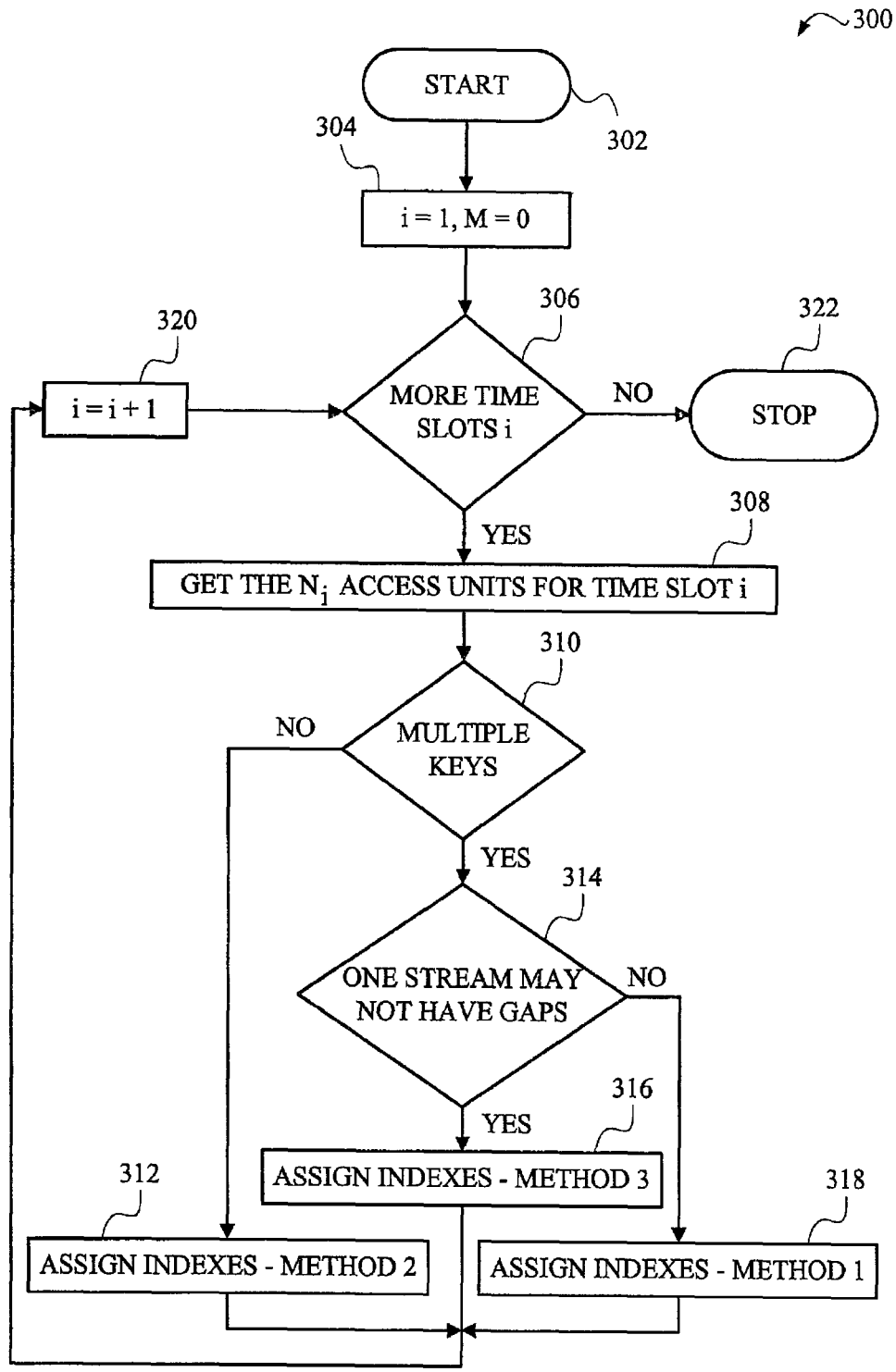
FIG. 3 is a flow diagram illustrating an overview of an encryption index assignment methodology according to the present invention.

Referring now to FIG. 3, a flow diagram illustrates an overview of an encryption index assignment methodology according to the present invention. It is to be understood that the methodology in FIG. 3 depicts an overview of how encryption index assignment methodologies (i.e., method 1, method 2, and method 3) associated with each case may be initiated.

The following notation shall be used to describe encryption index assignment operations. At any given time slot i, a set of streams is defined as having N(i) access units, the encryption indexes of these N(i) access units are C(1,i) through C(N(i),i) and the corresponding sizes of the access units are L(i) through L(N(i),i). M refers to a running intermediate encryption index.

As shown in methodology 300 of FIG. 3, the process begins at block 302. In step 304, i and M are initialized to one and zero, respectively. In step 306, the process determines whether there are more time slots to be considered. Assuming there are, the process retrieves the N(i) access units for time slot i. Step 310 determines whether there are multiple keys for the time slot. If no, then indexes are assigned in step 312 in accordance with method 2 (as will be explained below in the context of FIG. 7). If there are multiple keys for the time slot, step 314 determines whether one stream may not have gaps (as will be defined below). If yes, then indexes are assigned in step 316 in accordance with method 3 (as will be explained below in the context of FIG. 10). If a stream may have gaps (i.e., step 314 yields a "no" response), then indexes are assigned in step 318 in accordance with method 1 (as will be explained below in the context of FIG. 5). Then, in step 320, the time slot variable is incremented by one and if there are more time slots to consider (step 306), the process repeats. If there are no more time slots to consider, then the process ends at block 322. Thus, it is to be appreciated that methods 1, 2 and 3 ensure that the indexes of the current time slot increase as compared with those of the previous time slot.

Method 1: Each Stream has a Different Key

In the most common situation, a different key is used for each alternate access unit (or description) for any given time slot. If each access unit is represented as a horizontal bar with a size proportional to the length of that access unit, the solution can be depicted as shown in FIG. 4.

Figure 4:
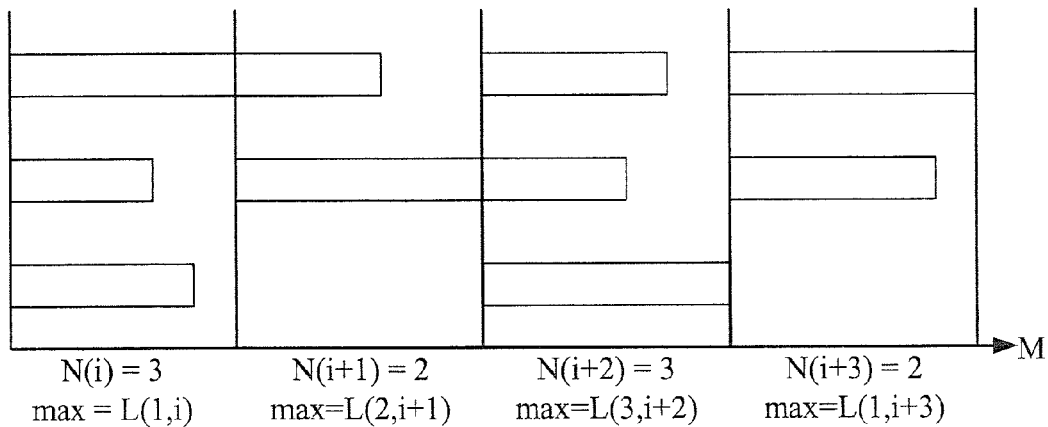
FIG. 4 is a diagram illustrating an index assignment example according to a first embodiment of the present invention.

More specifically, FIG. 4 is a diagram illustrating an index assignment example according to method 1 (step 318 of FIG. 3). As shown, in the first time slot (i), there are three access units, the longest one being the first access unit. In the second time slot (i+1), there are two access units, the longest one being the second access unit. In the third time slot (i+2), there are 3 access units, the longest one being the third. Finally, in the fourth time slot (i+3), there are two access units, the longest one being the first access unit. In FIG. 4, since the horizontal axis represents the running intermediate encryption index M, the encryption index can be seen increasing in value from left to right, according to the accumulative values of the access unit sizes from one time slot to the next. Such index assignment may be accomplished in accordance with the process depicted in FIG. 5.

Figure 5:
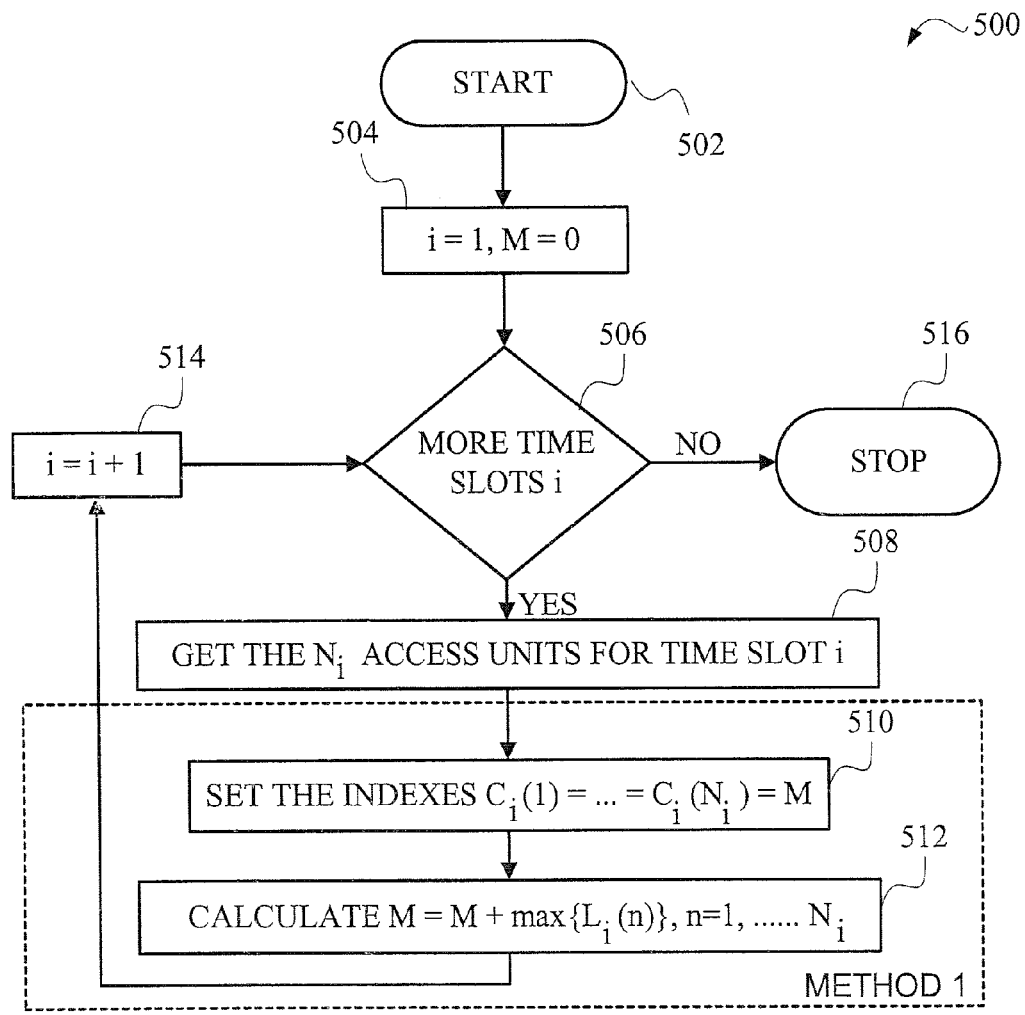
FIG. 5 is a flow diagram illustrating an encryption index assignment methodology according to a first embodiment of the present invention.

Referring now to FIG. 5, a flow diagram illustrates an encryption index assignment methodology according to method 1. The methodology 500 begins at block 502. It is to be appreciated that steps 504, 506, 508, 514 and 516 are respectively identical to steps 304, 306, 308, 320 and 322 of FIG. 3, and therefore their explanation will not be repeated.

Thus, in accordance with steps 510 and 512, the process takes the encryption stream index of each access unit from the set of alternate access units of the previous time slot and adds the corresponding access unit lengths to the indexes from the previous time slot (i.e., calculate $M=M+\max\{L_i(n)\}$, $n=1, \ldots, N_i$). Then, the encryption stream index of each access unit in the current time slot is set equal to or larger than the maximum of the computed sums.

So, if the indexes of the access units for the first time slot i=1 are:

$$C(1,1) = \ldots = C(N(1),1) = 0,$$

the process may calculate the indexes at time slot (i+1) to be all the same and equal to:

$$C(1,i+1) = \ldots = C(N(i+1),i+1) = \max_{(n=1, \ldots, N(i))}\{C(n,i) + L(n,i)\}$$

It should be noted here that in this exemplary equation the encryption index is assigned as equal to the maximum, but in general an encryption index that is equal to or larger than this value is a valid value. That is, while the example selects an index value equal to the maximum, any increment larger than that value may be employed.

Method 2: Each Stream Uses the Same Key

Figure 6:
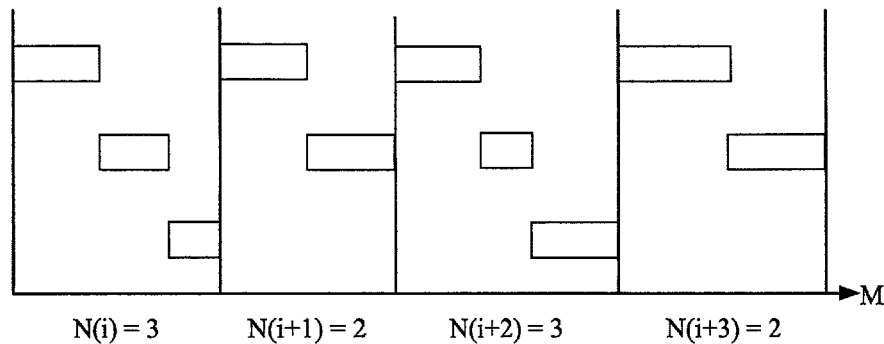
FIG. 6 is a diagram illustrating an index assignment example according to a second embodiment of the present invention.

In case a very simple key management system is used that allows only a single key per stream, then all alternate streams must use the same key. In that situation, the same index should not be used more than once and, thus, the index is incremented from one access unit to another as depicted in FIG. 6.

So the indexes of time slot (i+1) can be calculated as:

$$C(1,i+1) = C(N(i),i) + L(N(i),i)$$

$$C(2,i+1) = C(1,i+1) + L(1,i+1)$$

$$\ldots$$

$$C(N(i+1),i+1) = C(N(i+1)-1,i+1) + L(N(i+1)-1,i+1)$$

The index of the first access unit for the first time slot i=1 is:

$$C(1,1) = 0$$

Figure 7:
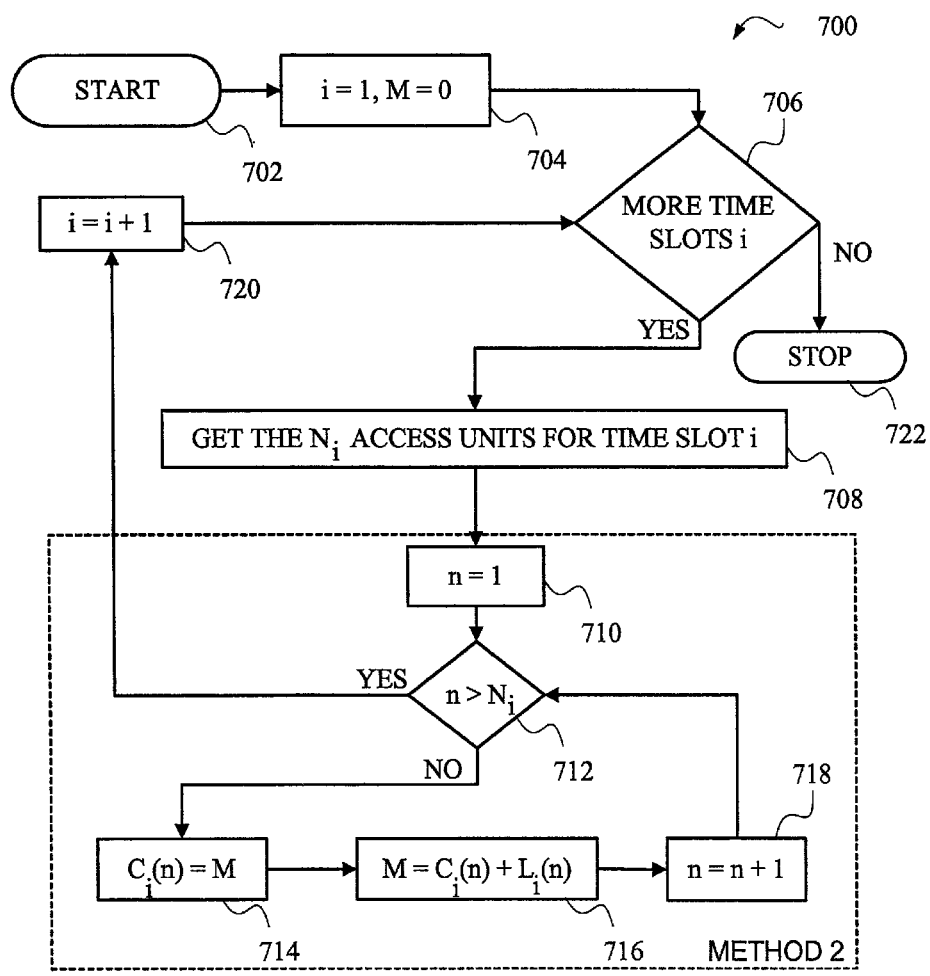
FIG. 7 is a flow diagram illustrating an encryption index assignment methodology according to a second embodiment of the present invention.

A flow diagram of this process is shown in FIG. 7. More specifically, FIG. 7 is a flow diagram illustrating an encryption index assignment methodology according to a second embodiment of the present invention (e.g., method 2 as referred to in step 312 of FIG. 3). The methodology 700 begins at block 702. Again, it is to be appreciated that steps 704, 706, 708, 720 and 722 are respectively identical to steps 304, 306, 308, 320 and 322 of FIG. 3, and therefore their explanation will not be repeated.

Thus, in accordance with steps 710 through 718, the process sets the encryption stream index of the first access unit in the set of alternate access units with the earliest time slot to an initial value. This is shown in step 714, where the first access unit (n=1, where n refers to a variable representing the number of the access unit in the subject set which is set to one in step 710) for the first time slot (i=1) is assigned the initial value for M, which was set in step 704 to the value of M=0. Then, in step 716, the last computed encryption stream index is obtained and the access unit length corresponding to the access unit that the encryption stream index was computed for is added to the last computed encryption stream index. Then, the encryption stream index of the next access unit is set equal to or larger than the computed sum value. It is to be understood that the next access unit (n=n+1, as incremented in step 718) is defined as the next access unit in the same alternate set or, if all encryption stream indexes in that the same set have been calculated, as tested for in step 712, the next access unit is the first access unit of the set of alternate access units of the next time slot.

Again, it should be noted here that in this exemplary equation the encryption index is assigned as equal to the maximum, but in general an encryption index that is equal to or larger than this value is a valid value. That is, while the example selects an index value equal to the maximum, any increment larger than that value may be employed.

Method 3: One Stream may not have Index Gaps

There are certain situations where a multimedia stream is self-contained, is delivered in a loss free environment (e.g., downloaded), and played back as is. An example of such a case is an MP3 audio file. When such a stream is encrypted with an indexed stream cipher and the index is used without gaps, i.e., the index of an access unit is exactly equal to the index plus the length of the previous one, the stream can be decrypted and played back by simply knowing the key and the index for the first byte (access unit) of the stream. Since there are no losses, it is not necessary to insert the index as is done in RTP over UDP. In that case, one alternate access unit from the set of choices is always part of that self-contained multimedia stream, e.g., MP3.

Figure 8:
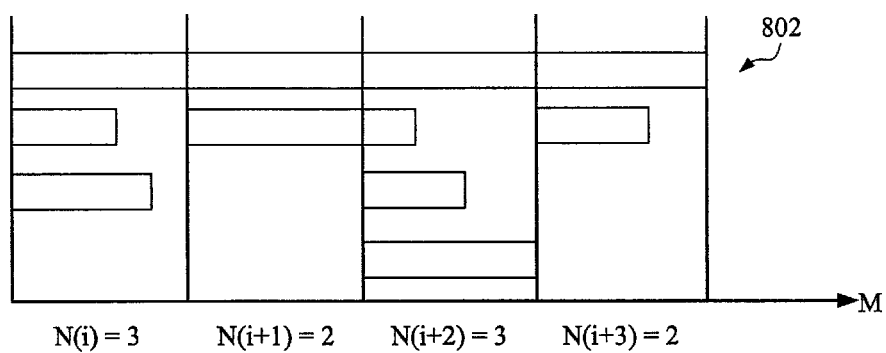
FIG. 8 is a diagram illustrating an index assignment example according to a third embodiment of the present invention.

The situation is illustrated in FIG. 8. That is, FIG. 8 depicts an index assignment example for when one stream must have continuous indexes without gaps. In this example, the first access unit is assumed to be part of this "main" stream, i.e., the desired stream without any gaps in the encryption index, denoted as 802 in FIG. 8.

It can be seen that a special case exists when an alternate access unit that is not part of the "main" stream is larger than the corresponding main stream access unit. In that case, the key that was used for the "too-long" access unit is not used. The encryption indexes are calculated here in the same manner as in the case where there is no constraint to a stream without gaps. If the other alternate access units are considered part of a media stream, this solution can thus be viewed as a key change.

Figure 9:
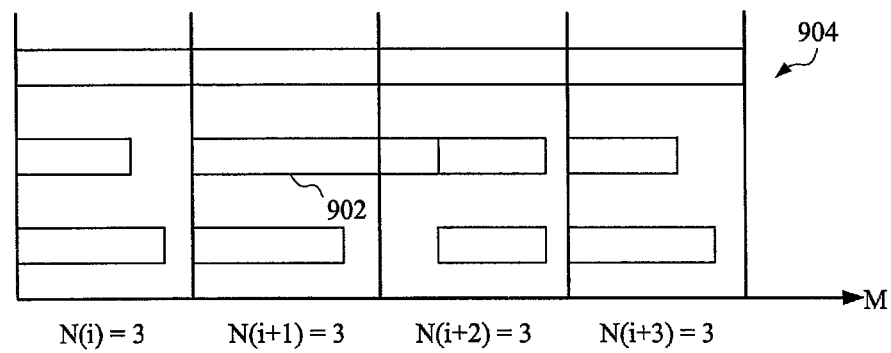
FIG. 9 is a diagram illustrating another index assignment example according to a third embodiment of the present invention.

In the case where a key change is not desirable or not possible, for example, when the alternate access units are generated as part of alternate streams, each access unit uses exactly a single key. In that case, the server may not always have total freedom in selecting access units (or streams in this case). An example of this is shown in FIG. 9. That is, FIG. 9 depicts an index assignment example for when one stream must have continuous indexes without gaps and no key change is allowed.

In this example, if the server sent the "problem" access unit for time slot (i+1), denoted as 902 in FIG. 9, then from time slot (i+2), it is not allowed to select the access unit from the "main" stream with the continuous indexes, denoted as 904 in FIG. 9. Note that in the example of FIG. 6, it is possible to choose an index of the third stream, such that it is possible to select that access unit after the "problem" access unit is selected.

Figure 10:
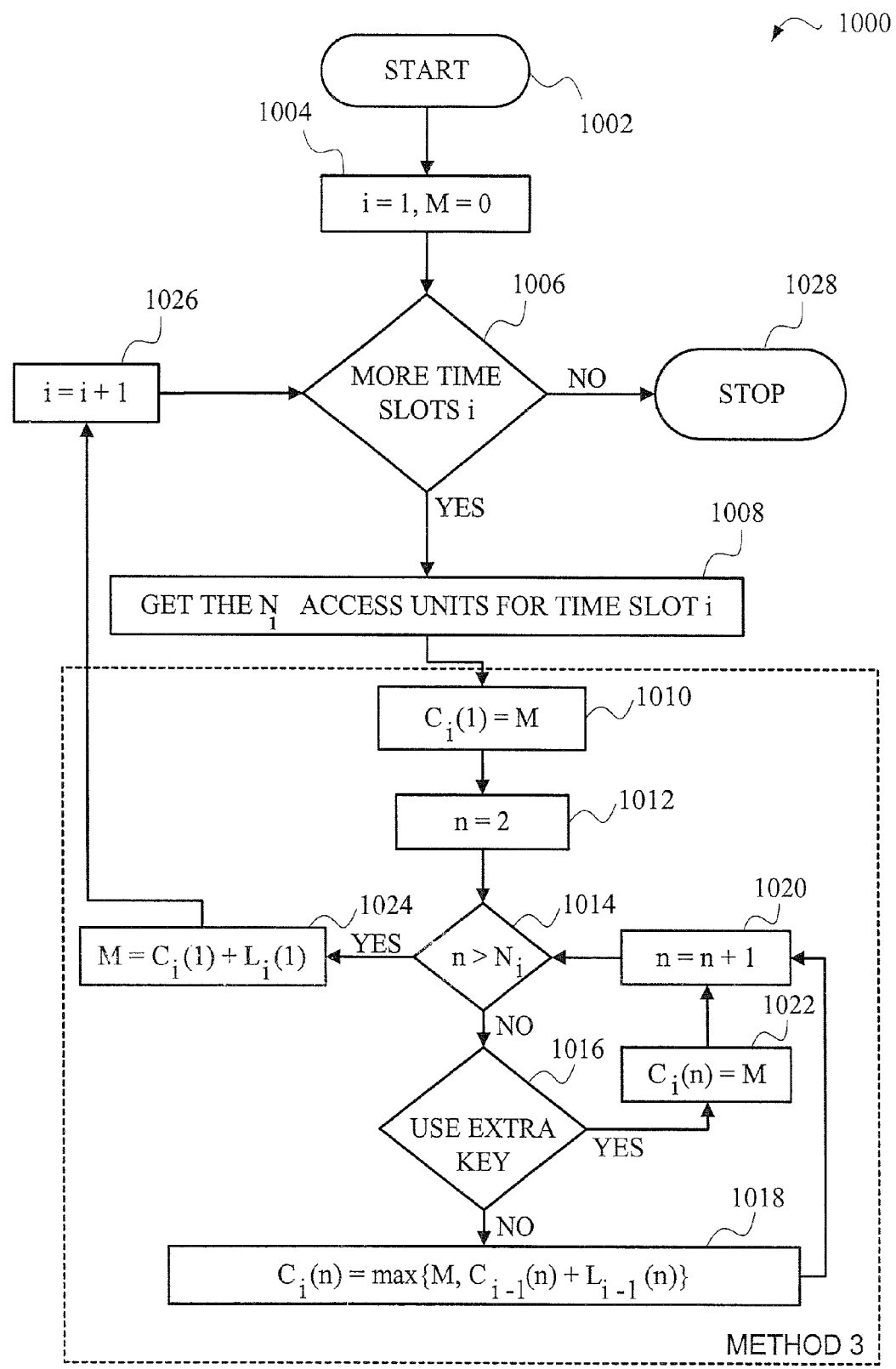
FIG. 10 is a flow diagram illustrating an encryption index assignment methodology according to a third embodiment of the present invention.

A flow diagram of this process is shown in FIG. 10. More specifically, FIG. 10 is a flow diagram illustrating an encryption index assignment methodology according to a third embodiment of the present invention (e.g., method 3 as referred to in step 316 of FIG. 3). The methodology 1000 begins at block 1002. Again, it is to be appreciated that steps 1004, 1006, 1008, 1026 and 1028 are respectively identical to steps 304, 306, 308, 320 and 322 of FIG. 3, and therefore their explanation will not be repeated.

Thus, in accordance with steps 1010 through 1024, the process sets the encryption stream index of the access unit of the special stream for time slot i equal to the value M in step 1010. The value M was initialized to the zero in step 1004. The special stream is defined as that stream that is selected to not have encryption index gaps and will be assigned the stream index n=1 in the example of FIG. 10. Then, in step 1016, the process tests if an extra key may be used, and if so, the encryption stream index of the other access units in the same time slot are set equal to or greater than the encryption stream index of the access unit of the special stream, as shown in step 1022. If no extra key may be used, in step 1018, the encryption index of the access unit n in slot i is set to the maximum of the encryption index M of the special stream (which has index n=1) and the sum of the previous access unit encryption index and the corresponding size. Steps 1014 and 1020 have the same function as steps 712 and 718 of FIG. 7. Note that n is set to two (n=2) in step 1012 because n=1 was calculated in step 1010 as the main stream.

Again, it should be noted here that in this exemplary equation the encryption index is assigned as equal to the maximum, but in general an encryption index that is equal to or larger than this value is a valid value. That is, while the example selects an index value equal to the maximum, any increment larger than that value may be employed.

Figure 11:
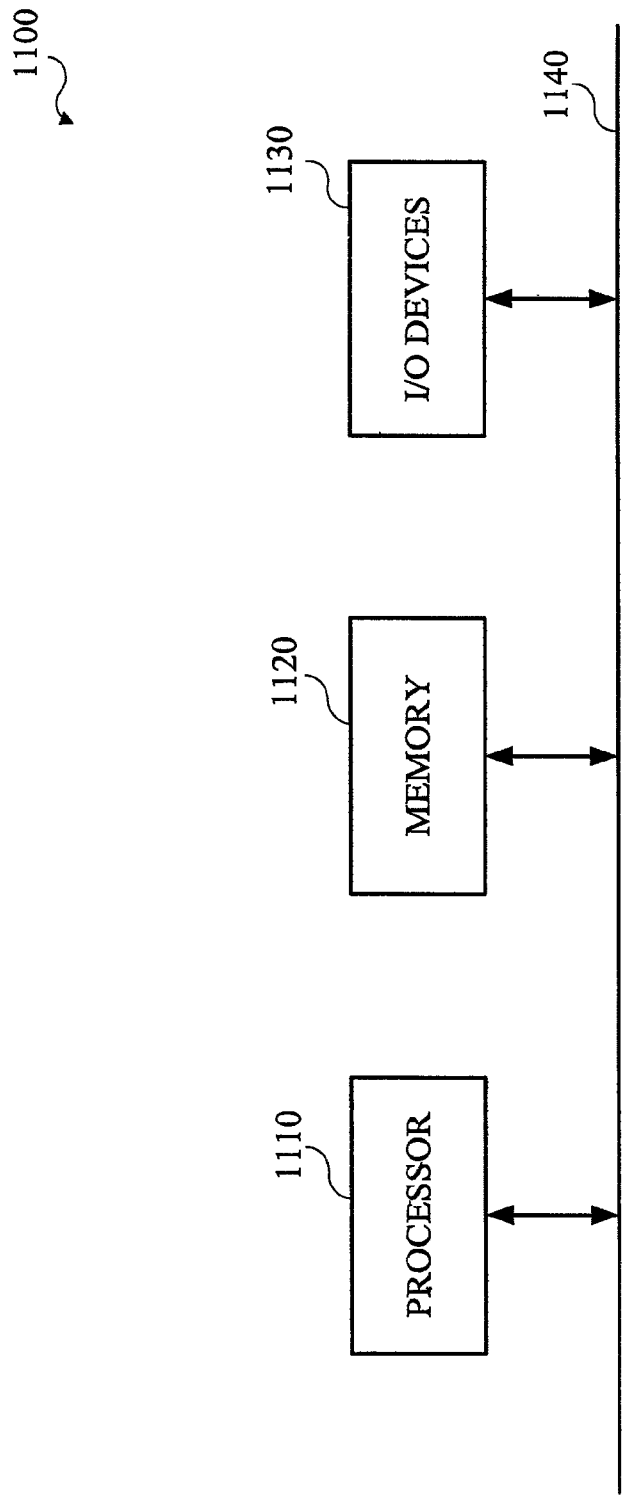
FIG. 11 is a block diagram illustrating an exemplary computing system environment for implementing a data processing system according to an embodiment of the present invention.

Referring now to FIG. 11, a block diagram illustrates an exemplary computing system environment for implementing systems and corresponding methodologies of the invention, e.g., as described above in the context of FIGS. 1-10. For example, it is to be understood that the computing system shown in FIG. 11 may represent a computing system used to implement a content creation system and/or a content delivery system/server as shown in FIG. 1 (as well as components thereof shown in FIG. 2). The computing system in FIG. 11 may also represent a computing system used to implement a client device as shown in FIG. 1. One or more of such computing systems may communicate over a distributed network. The network may be any suitable network across which the computer systems can communicate, e.g., the Internet or Word Wide Web, local area network, etc. However, the invention is not limited to any particular type of network. In fact, it is to be understood that the computer systems may be directly linked without a network.

As shown, the computing system 1100 comprises a processor 1102, memory 1104 and I/O devices 1106, all coupled via a computer bus 1108. It should be understood that the term "processor" as used herein is intended to include one or more processing devices, including a central processing unit (CPU) or other processing circuitry, e.g., digital signal processor, application-specific integrated circuit, etc. Also, the term "memory" as used herein is intended to include memory associated with a processor or CPU, such as RAM, ROM, a fixed, persistent memory device (e.g., hard drive), or a removable, persistent memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

It is also to be understood that the computing system illustrated in FIG. 11 may be implemented in the form of a variety of computer architectures depending on the functions performed thereby, e.g., a server, a personal computer, a microcomputer, a minicomputer, a personal digital assistant, a cellular phone, etc. However, the invention is not limited to any particular computer architecture.

Accordingly, software instructions or code for performing the methodologies of the invention, as described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing content for delivery in an information system, wherein the content is representable as access units, the method comprising the steps of:
   obtaining a set of alternate versions of an access unit for a current time slot associated with the content; and
   assigning, by a processor of the information system, an encryption index to each access unit in the set of alternate versions of the access unit in the current time slot such that an encryption index increases over time.

2. The method of claim 1, wherein the assigning step further comprises assigning an encryption index to each access unit in the set of alternate versions of the access unit in the current time slot such that an encryption index increases with respect to each encryption index of each access unit from a set of alternate versions of an access unit for a previous time slot.

3. The method of claim 1, wherein each alternate version of the access unit uses a different encryption key.

4. The method of claim 1, wherein each alternate version of the access unit uses the same encryption key.

5. The method of claim 4, wherein the assigning step further comprises the steps of:
   setting the encryption index of the first access unit in the set of alternate versions of the access unit with the earliest time slot to an initial value;
   obtaining the last computed encryption index and computing a sum by adding the access unit length corresponding to the access unit for which the encryption index was computed; and
   setting the encryption index of the next access unit equal to or larger than the computed sum.

6. The method of claim 5, wherein a next access unit is defined as the next access unit in the same alternate set or, when encryption indexes in the same alternate set have been assigned, the next access unit is the first access unit of the set of alternate versions of the access unit of the next time slot.

7. The method of claim 1, wherein the encryption index of each access unit of a particular stream of access units is equal to the sum of the encryption index of the previous access unit plus the length of the previous access unit.

8. The method of claim 7, wherein the particular stream of access units comprises a stream of access units selected to not have an encryption index gap.

9. The method of claim 7, wherein the assigning step further comprises the steps of:
   obtaining the encryption index of the access unit of the particular stream for a given time slot; and
   setting the encryption index of the other access units in the same time slot equal to or greater than the encryption index of the access unit of the particular stream.

10. The method of claim 1, wherein the content is multimedia content.

11. The method of claim 1, wherein the obtaining and assigning steps are performed in accordance with a content creation system.

12. The method of claim 11, wherein access units and encryption indexes are provided to at least one delivery server for subsequent delivery to at least one client device.

13. Apparatus for processing content for delivery in an information system, wherein the content is representable as access units, the apparatus comprising:
   a memory; and
   at least one processor coupled to the memory and operative to: (i) obtain a set of alternate versions of an access unit for a current time slot associated with the content; and (ii) assign an encryption index to each access unit in the set of alternate versions of the access unit in the current time slot such that an encryption index increases over time.

14. The apparatus of claim 13, wherein the assigning operation further comprises assigning an encryption index to each access unit in the set of alternate versions of the access unit in the current time slot such that an encryption index increases with respect to each encryption index of each access unit from a set of alternate versions of an access unit for a previous time slot.

15. The apparatus of claim 13, wherein each alternate access unit uses a different encryption key.

16. The apparatus of claim 13, wherein each alternate version of the access unit uses the same encryption key.

17. The apparatus of claim 16, wherein the assigning operation further comprises:
   setting the encryption index of the first access unit in the set of alternate versions of the access unit with the earliest time slot to an initial value;
   obtaining the last computed encryption index and computing a sum by adding the access unit length corresponding to the access unit for which the encryption index was computed; and
   setting the encryption index of the next access unit equal to or larger than the computed sum.

18. The apparatus of claim 17, wherein a next access unit is defined as the next access unit in the same alternate set or, when encryption indexes in the same alternate set have been assigned, the next access unit is the first access unit of the set of alternate versions of the access unit of the next time slot.

19. The apparatus of claim 13, wherein the encryption index of each access unit of a particular stream of access units is equal to the sum of the encryption index of the previous access unit plus the length of the previous access unit.

20. The apparatus of claim 19, wherein the particular stream of access units comprises a stream of access units selected to not have an encryption index gap.

21. The apparatus of claim 19, wherein the assigning operation further comprises:
   obtaining the encryption index of the access unit of the particular stream for a given time slot; and
   setting the encryption index of the other access units in the same time slot equal to or greater than the encryption index of the access unit of the particular stream.

22. The apparatus of claim 13, wherein the content is multimedia content.

23. The apparatus of claim 13, wherein the obtaining and assigning operations are performed in accordance with a content creation system.

24. The apparatus of claim 23, wherein access units and encryption indexes are provided to at least one delivery server for subsequent delivery to at least one client device.

25. Apparatus for processing content for delivery in an information system, the apparatus comprising:
   a content creation system operative to: (i) obtain a set of alternate versions of an access unit for a current time slot associated with the content; and (ii) assign an encryption index to each access unit in the set of alternate versions of the access unit in the current time slot such that an encryption index increases over time.

26. An article of manufacture for processing content for delivery in an information system, comprising a machine readable medium containing one or more programs which when executed implement the steps of:
   obtaining a set of alternate versions of an access unit for a current time slot associated with the content; and assigning an encryption index to each access unit in the set of alternate versions of the access unit in the current time slot such that an encryption index increases over time.

* * * * *